United States Patent [19]

Arterburn

[11] Patent Number: 5,620,493
[45] Date of Patent: Apr. 15, 1997

[54] METHOD AND APPARATUS FOR DETECTING FIBER BREAKS

[75] Inventor: Russell D. Arterburn, Athens, Tenn.

[73] Assignee: Schuller International, Inc., Denver, Colo.

[21] Appl. No.: 369,039

[22] Filed: Jan. 5, 1995

[51] Int. Cl.$^6$ .................................................. C03B 37/07
[52] U.S. Cl. .................................. 65/377; 65/384; 65/487
[58] Field of Search ........................... 65/377, 384, 484, 65/487

[56] References Cited

U.S. PATENT DOCUMENTS

| | | | |
|---|---|---|---|
| 3,820,967 | 6/1974 | Johnson | 65/484 X |
| 3,986,853 | 10/1976 | Coggin, Jr. et al. | 65/487 X |
| 4,285,712 | 8/1981 | Thompson | 65/384 X |

Primary Examiner—David A. Simmons
Assistant Examiner—M. Curtis Mayes
Attorney, Agent, or Firm—Cornelius P. Quinn

[57] ABSTRACT

Disclosed is an improved device and method for detecting fiber breakouts and fiber restarts in processes or systems for making fibers from a molten thermoplastic material. In these processes the running fibers induce ambient air into the array of hot fibers close to the nozzles where the fibers are formed, but this air flow essentially ceases when the fiber breaks out. A thermocouple junction located in the path of this airflow will sense temperature changes caused by fiber breakouts and fiber starts. The present invention simplifies and increases the accuracy of prior art sensor systems by eliminating hardware holding this thermocouple and instead uses one or more small holes in a bushing frame plus the refractory used to hold the fiberizing bushing in the frame to hold the thermocouple in the appropriate place.

12 Claims, 2 Drawing Sheets

METHOD AND APPARATUS FOR DETECTING FIBER BREAKS

SCOPE

This invention pertains to an improvement in the methods and apparatus used to make fibers from a molten material such as glass, thermoplastics, etc. and more particularly to improvements in a detection system for sensing fiber breakouts in the process.

BACKGROUND

Making fibers from molten material by extruding the melt through a plurality of nozzles (tips) or holes in a metal bushing is well known as shown in U.S. Pat. Nos. 4,740,224 and 5,244,483 for making glass fibers, the disclosures of which are hereby incorporated by reference. In these and other similar fiber making processes, the fibers frequently break for various known and unknown reasons causing breakouts of large portions of the bushing or the entire bushing. The breakouts usually start with a single fiber breaking out while the remaining hundreds to thousands of fibers from a single bushing continue to run. In a few seconds to minutes after the first fiber breaks, the bead down of that fiber will cause other fibers to break and soon many or all of the fibers will be broken out. In the event that the bushing is designed to avoid bead down during running, there is still a need to know when a certain number of fibers have broken out so that the bushing can be restarted to get all of the tips running fibers again. For evaluation and optimizing purposes it is desirable to have a record of the number and time, duration, etc. of breakouts for each bushing position.

To meet these needs, breakout detection systems have been developed. The breakout detection system (BODS) usually consists of a thermocouple mounted onto the frame of each fiberizing bushing such that the junction end of the thermocouple projects below the bushing frame and into the location where room air is pulled into the bushing tip area and fiber array by the induction created by the rapidly moving array of fibers as they are pulled downward and away from the bushing. As each fiber breaks out, less air is drawn past the thermocouple junction. After several fibers have broken out, there is enough of a temperature gain at the thermocouple junction to exceed normal temperature variation and a break is sensed and recorded.

While this system has worked very satisfactorily, the stainless thermocouple mount and Inconel protection tube required are expensive, hinder air flow, and are obstacles to bushing maintenance. Finally, the accuracy of the system can be modified by accidentally, or intentionally, moving the mount or the protection tube.

BRIEF DESCRIPTION OF THE INVENTION

The present invention eliminates the shortcomings of the prior system by eliminating the thermocouple mount and Inconel protection tube, locating the thermocouple consistently close to the bushing tips, and fixing it in place with a material and step already involved in the mounting of the bushing in the bushing frame. This is accomplished by locating a BODS thermocouple junction sensor below the plane of the bottom of the tip plate of the bushing, preferably about one quarter of an inch below, and at least about one quarter inch from the closest lower edge of the bushing, preferably about one half inch to an inch or more. The thermocouple is held in place by a refractory, preferably a cast in place refractory, that is normally used to mount or hold the bushing in the bushing frame, and preferably additionally by the wall of a hole or opening in the bottom wall of the bushing frame. The thermocouple is made up of two wires of dissimilar material suitable to the environment of the location, such as chromel and alumel when used in a glass fiber process, and these wires, or leads to them, exit the cast refractory through a hole or opening in the sidewall of the bushing frame, which opening can also be used for the leads to or wires of one or more bushing control thermocouples. Preferably each of the wires of the thermocouple further comprise a thermally and electrically insulating sleeve surrounding each wire of said thermocouple and extending from outside said opening in said sidewall to outside said opening in said bottom wall, but stopping short of said junction of said thermocouple.

The BODS thermocouple leads are connected to a computer which records, analyzes and reports breakouts and starts for each bushing and related group of bushings. Using the method and apparatus of this invention results in a less costly and more reliable system.

DETAILED DESCRIPTION OF THE INVENTION

Figure 1:
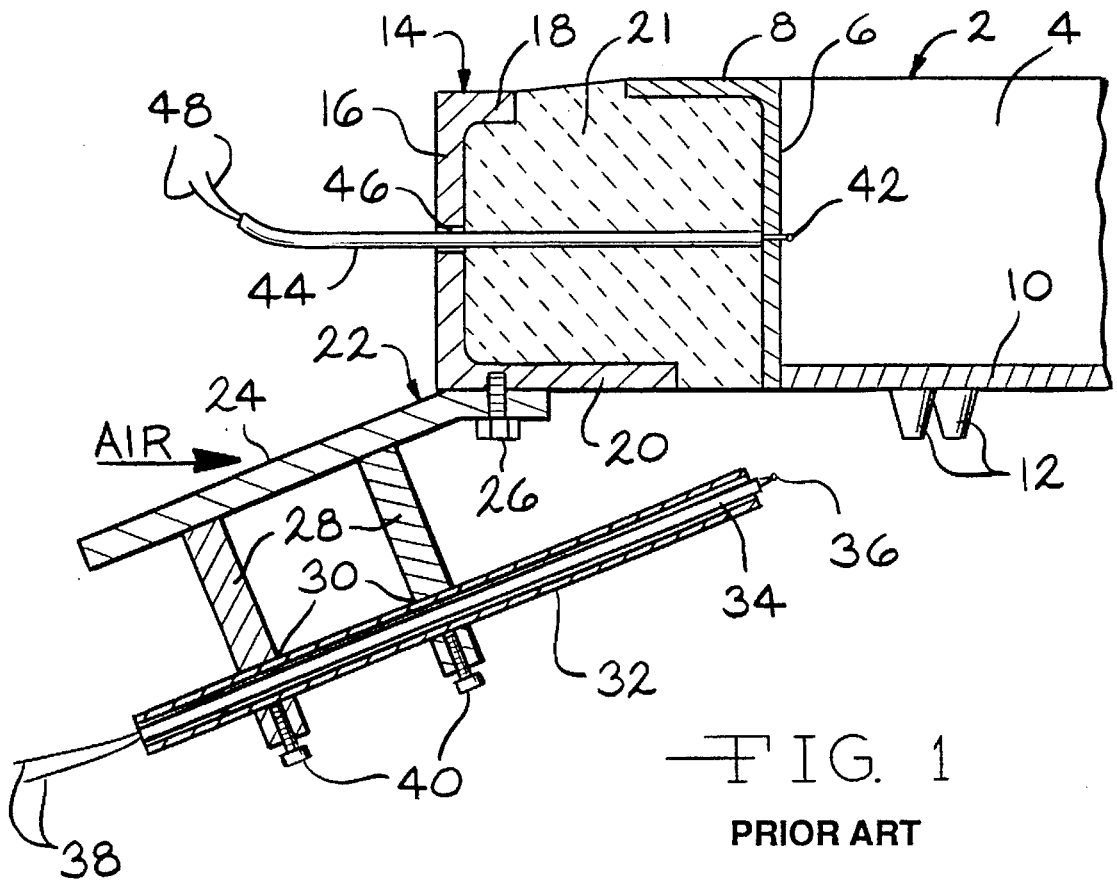
FIG. 1 is a partial cross section of a bushing mounted into a frame having a prior art BODS thermocouple mount bolted onto the frame of the bushing and holding a BODS thermocouple sensor inside an Inconel tube.

FIG. 1 shows a prior art BODS system. A conventional precious metal fiber forming bushing 2 comprising end walls 4, side walls 6, a flange 8, and an orifice plate 10 having nozzles 12 on its underneath side is held in place and supported inside a frame 14 made from a high temperature alloy like Inconel in a known manner. The frame 14 comprises a side wall 16, a top wall 18 and a bottom wall 20. The frame 14 is spaced from the bushing 2 by an inch or more and the space between the bushing 2 and frame 14 is filled with an electrically and thermally insulating refractory 21, like a castable insulating refractory able to withstand the operating temperatures without significant shrinkage. The bushing is heated by electrical current through the bushing 2 using power leads clamped onto ears 13 (see FIG. 3) on the exterior of the end walls 4 of the bushing 2. The bushing temperature is monitored with a thermocouple having the thermocouple junction 42 welded to the bushing sidewall 6 and leadwires 48 of the thermocouple connected to a temperature recorder and controller (not shown) in a well known manner.

In the prior art BODS a junction of a thermocouple 36 is held in the desired location of about one half inch below and about one inch from the first row of the tips 12 with a thermocouple mount 22. The mount 22 comprises an angled bracket 24, one end of which is horizontal and fastened to the underneath side of the bottom wall 20 of the frame 14 with a bolt 26 threaded into the bottom wall 20, and the other end being spaced from the frame 14 a few inches in the opposite direction from the bushing 2 and below the bottom surface of the bottom wall 20. The angled portion of the bracket 24 has two legs 28 connected to its underneath side and extending downwardly. Each of the legs 28 have a round hole close to their bottom end which align with each other for holding a thermocouple protection tube 32 using set screws 40 for holding the tube 32 in place. The thermocouple 36, with a ceramic spaghetti insulating sheath 34 thereon, is placed in the protection tube 32 with the other ends 38 of the thermocouple 36 exiting the tube 32 where they can be connected to a lead to the computer in a known manner.

In operation, molten material like glass flows into the bushing in a known manner and extrudes out through the nozzles 12 to form fibers which are pulled at high speeds in a known manner to attenuate the fiber to the desired fiber diameter. The location of the junction of the thermocouple 36 tends to be very hot due to its proximity to the bushing 2 which when making E glass fiber is above 2000 degrees F. However, when all or almost all of the fibers are being pulled downwardly at high speed, this movement induces room air to be pulled across the underneath side of the bottom wall 20 of the frame 14, past the junction of the thermocouple 36 and into the fiber array. This room air flowing past the junction of the thermocouple 36 cools the junction considerably. When a certain number of fibers break, the amount of room air induced is reduced and the junction of the thermocouple heats up enough to signal a breakout. When the bushing is restarted and all or almost all of the fibers are running again the junction of thermocouple is cooled down and signals that the bushing is running.

This system works reasonably good when everything is in adjustment, but the mount 22 and the tube 32 are in a vulnerable location to getting bumped when the operators or tenders are cleaning the cooling tubes (not shown) of the bushing or making ear clamp adjustments to the electrical leads. This causes the junction of the thermocouple to be dislocated which reduces the effectiveness of the BODS. The mount 22 and tube 32 also impede the flow of room air to a small portion of the bushing which is undesirable and the mount 22 and tube 32 are expensive considering that thousands of bushings are in use in the industry today.

Figure 2:
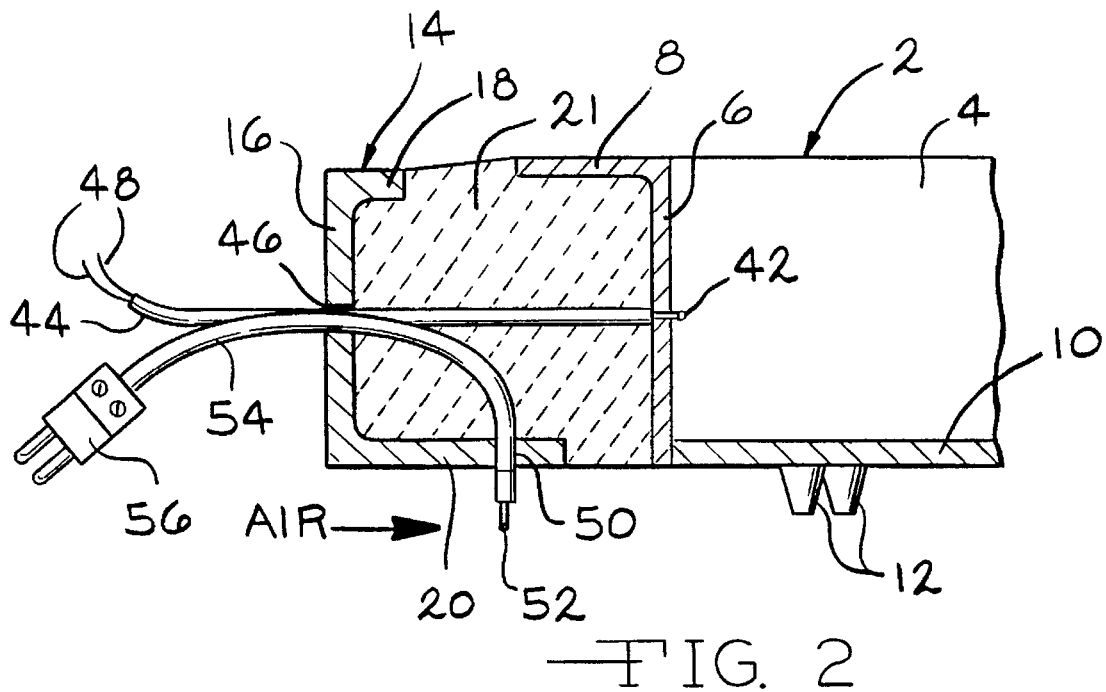
FIG. 2 is a partial cross section of a bushing mounted into a frame and having a BODS thermocouple mounted according to the present invention.
Figure 3:
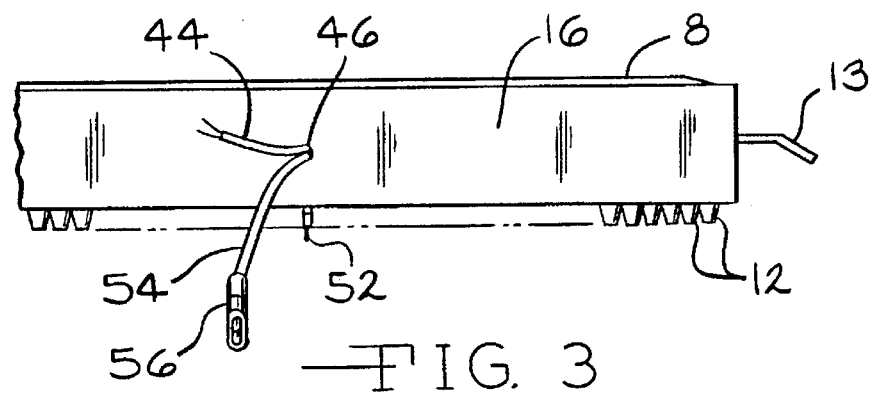
FIG. 3 is a partial front view of the apparatus shown in FIG. 2.
Figure 4:
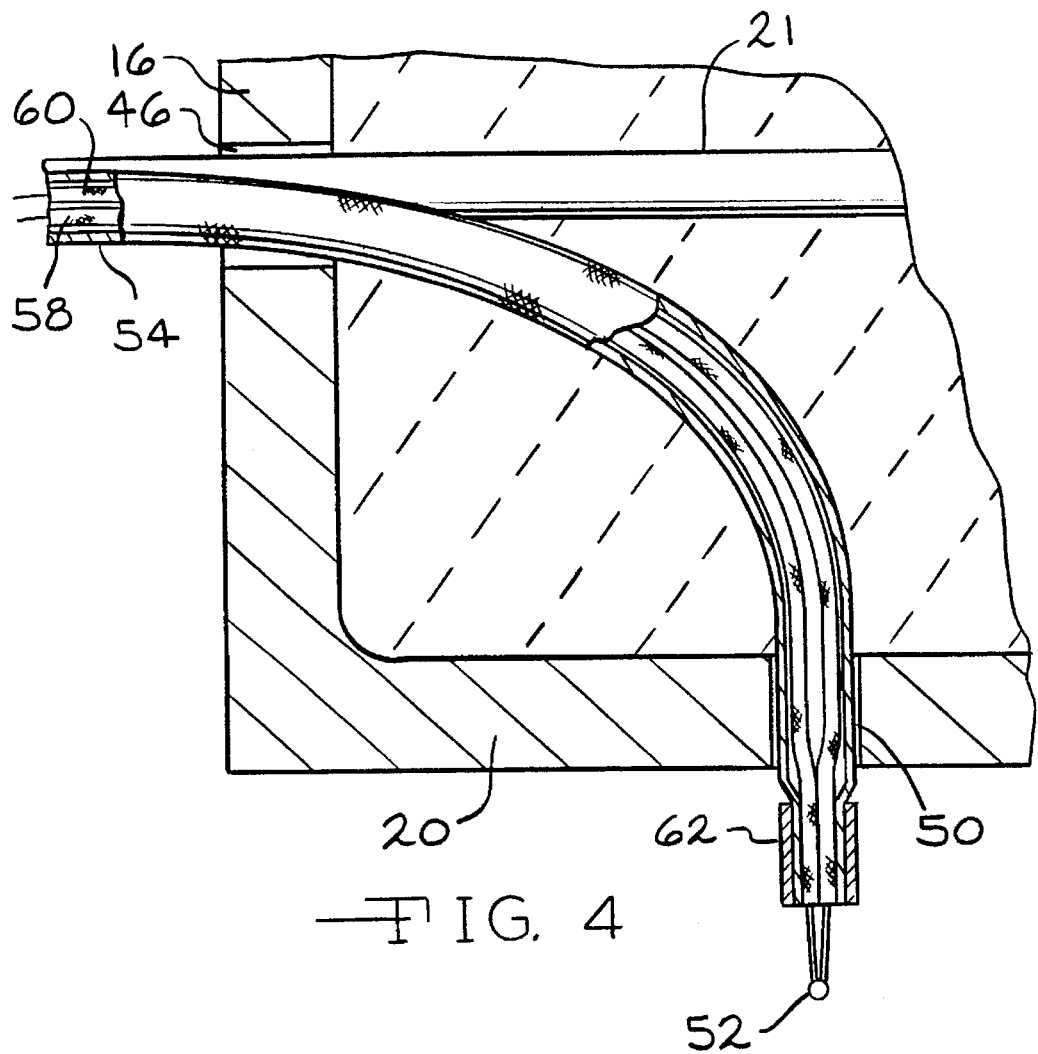
FIG. 4 is a partial cross section of the BODS thermocouple and frame shown in FIG. 2.

FIGS. 2-4 show the present invention which solves these undesirable features of the prior art BODS. Referring to FIG. 2 which is a partial cross section of a bushing and a slightly modified frame like those shown in FIG. 1, the BODS thermocouple 52 is mounted in a very simple and relatively inexpensive manner. The bushing 2 and frame 14 are the same as shown in FIG. 1 except in the preferred embodiment of the present invention the bottom wall 20 of the frame 14 has a small hole 50, preferably about one quarter of an inch in diameter, located about five eights of an inch from the midpoint of the length of said frame and about three eights of an inch or more from the sidewall 6 of the bushing 2. The thermocouple 52, in a flexible sheath 54 is inserted into the hole 46 of the frame beside the control thermocouple sheath 44, bent and extended through the hole 50 until the junction is below the bottom of the bottom wall 20, preferably about one quarter to one half inch, and most preferably about three eights of an inch. Preferably a castable refractory is then poured into the space between the frame and the bushing and around the portion of the thermocouple 52 that is inside the frame 14. The thermocouple 52 and sheath 54 is held in place by the hardened castable refractory 21. The other end of the thermocouple 52 is connected to a male connector 56 which, after installation of the frame 14 and bushing 2, can be connected to a female connector of the end of a line leading to the computer.

FIG. 3 shows the location of the hole 46 in the sidewall 16 of the bushing frame 14 and the location of the junction of the BODS thermocouple sensor 52. When the plug 56 is connected to the female plug (not shown) both will be well above the junction of the thermocouple 52. Note that the top surface of the flange 8 is higher than the top surface of the frame 14 to prevent the frame from interfering or preventing a good seal between the top of the flange 8 and the underneath side of a bushing block on the bottom of a forehearth.

FIG. 4 shows more detail of how the preferred BODS thermocouple of the present invention is constructed. Each wire of a type K or chrome—alumel thermocouple 52 is encased in a sheath of flexible, electrically insulating material, such as braided fiber glass sheaths 58 and 60 and these in turn are encased in a braided fiberglass sheath 54. The end portion of the sheath 54 closest to the junction 52 of the thermocouple is wrapped tightly with one or more layers of a fiber glass reinforced tape 62 to prevent the ends of the sheaths 54, 58 and 60 from fraying. With this mounting according to the present invention, the position of the BODS thermocouple junction 52 is much more consistent than it was in the prior art mounting system and procedure.

In operation, molten glass is fed to the bushing 2 and flows through nozzles 12 at the proper temperature for fiberization. Beads of glass form below the nozzles 12 until their weight causes them to break loose from the ends of the nozzles and fall, each pulling a primary fiber behind it from the nozzle. The speed of the primary fibers slowly falling by their own weight and flow of glass from the nozzles do not induce any appreciable flow of air into the array of primary fibers, thus the temperature at the junction 52 is relatively high due to the radiation from the molten glass and hot bushing 2 and nozzles 12. When the array of fibers is started into a winder or chopper and pulled at several thousand feet per minute to attenuate the primary fibers to the desired fiber diameter, the fibers pull air along close to their surfaces creating a partial vacuum close to the nozzles. Ambient air from the area adjacent the bushing rushes into this low pressure zone, passing by the thermocouple 52 and cooling the junction. This change of temperature sensed by the junction 52 signals the computer that fiberization of that bushing has begun. Sometime later as fibers breakout, beads form and then primary fibers form on the nozzles whose fibers broke out. This reduces the flow of air past the junction 52 and it begins to heat up. When its temperature has increased a predetermined amount this signals the computer that a breakout has occurred and an appropriate signal is sent to the operator.

By recording these signals and programming the computer to report this data in particular ways, such as by bushing, operator assignments, product type, etc., useful data is accumulated. For this data to be most useful, the thermocouple 52 must be accurate and reliable. The thermocouple system and arrangement shown in FIGS. 2-4 is much more trouble free and accurate than the prior art system and thus provides more useful data, which data is used to improve the efficiency, productivity and cost of the fiber manufacturing process.

Modifications of the present invention will be apparent to those skilled in the art, e.g. by changing the location of the hole 50 or by bringing the thermocouple through the gap between the bottom wall 20 of the frame 14 and the side wall 6 of the bushing 2 and holding it in place with the castable refractory 21. By proper hole placement in the side and bottom walls of the frame, a rigid, straight thermocouple and protection tube can be used in place of the flexible BODS thermocouple used in the preferred embodiments of the invention. The location of the junction of the BODS thermocouple can be varied some with similar results. These and other modifications are within the scope of the claimed invention.

I claim:

1. In a process of making fibers by extruding a molten material through holes or nozzles of a fiber forming bushing to form an array of fibers and pulling said fibers at a high speed to attenuate said fibers to a desired fiber diameter whereby ambient air streams are induced into the array of fibers when they are being pulled at high speed and whereby said bushing is mounted and held in place inside a frame with a refractory material, detecting a breakout of the fibers with a thermocouple junction held in the path of said ambient air stream, wherein the improvement comprises passing the breakout detecting thermocouple through said refractory material to locate said junction in said path.

2. The process of claim 2 wherein said junction is held in a consistent position in said path by said refractory material.

3. The process of claim 2 wherein said frame has a sidewall and wherein said thermocouple passes through an opening in the sidewall before it contacts said refractory.

4. The process of claim 1 wherein said frame has a sidewall and wherein said thermocouple passes through an opening in the sidewall before it contacts said refractory.

5. The process of claim 3 wherein said frame also has a bottom wall and wherein said thermocouple passes from said refractory material and out through an opening in said bottom wall and into said path.

6. The process of claim 4 wherein said frame also has a bottom wall and wherein said thermocouple passes from said refractory material and out through an opening in said bottom wall and into said path.

7. The process of any of claims 1–6 wherein each wire of said thermocouple is encased in a sheath of thermal and electrically insulating material from a point prior to where the thermocouple passes into said refractory material and for a selected distance beyond where the thermocouple leaves said refractory material, said insulating material stopping short of said thermocouple junction.

8. A system for detecting fiber breakouts in a process of making fiber from a molten thermoplastic material wherein said process comprises feeding said molten material to a fiberizing bushing having nozzles, said bushing being held in place by refractory material inside a frame, and pulling an array of fibers at high speed from molten glass flowing through said nozzles whereby ambient air streams are pulled into the area around said nozzles and into said array of fibers, comprising means for holding a thermocouple such that the junction of said thermocouple is in the path of said air streams and means for interpreting the signal from said thermocouple to determine when said bushing has broken out and when said bushing is running with respect to time, the improvement comprising said holding means is said refractory material.

9. The system of claim 8 wherein said frame comprises a sidewall having an opening therein and wherein said thermocouple passes through said opening and into said refractory material.

10. The system of claim 9 wherein said refractory material is a cast refractory.

11. The system of claim 10 wherein said frame also includes a bottom wall having an opening therein and wherein said thermocouple passes through said opening in said bottom wall.

12. The system of any one of claims 8–11 further comprising a thermally and electrically insulating sleeve surrounding each wire of said thermocouple from outside said opening in said sidewall to outside said opening in said bottom wall, but stopping short of said junction of said thermocouple.

* * * * *